United States Patent
Duebel et al.

(10) Patent No.: US 7,160,638 B1
(45) Date of Patent: Jan. 9, 2007

(54) FUEL CELL SYSTEM AND METHOD FOR GENERATING ELECTRICAL ENERGY USING A FUEL CELL SYSTEM

(75) Inventors: Olaf Duebel, Isenbuettel (DE); Axel Koenig, Wolfsburg (DE); Per Ekdunge, Göteborg (SE); Peter Alin, Landskrona (SE); Jessica Grace Reinkingh, Malvern, PA (US); Ronald Mallant, Alkmaar (NL)

(73) Assignees: Volkswagen AG, Wolfsburg (DE); AB Volvo, Gothenburg (SE)

( * ) Notice: Subject to any disclaimer, the term of this patent is extended or adjusted under 35 U.S.C. 154(b) by 0 days.

(21) Appl. No.: 09/700,833

(22) PCT Filed: May 17, 1999

(86) PCT No.: PCT/EP99/03378

§ 371 (c)(1),
(2), (4) Date: Jun. 7, 2001

(87) PCT Pub. No.: WO99/60647

PCT Pub. Date: Nov. 25, 1999

(30) Foreign Application Priority Data

May 20, 1998 (DE) .................................. 198 22 691

(51) Int. Cl.
*H01M 8/06* (2006.01)

(52) U.S. Cl. .............................. 429/17; 429/19; 429/20
(58) Field of Classification Search .................. 429/13, 429/19, 17; 423/235; 110/203, 215, 216, 110/302, 306

See application file for complete search history.

(56) References Cited

U.S. PATENT DOCUMENTS

| | | | |
|---|---|---|---|
| 4,657,829 A | | 4/1987 | McElroy et al. |
| 5,330,727 A | * | 7/1994 | Trocciola et al. ........... 422/177 |
| 5,360,679 A | | 11/1994 | Buswell et al. |
| 5,658,681 A | | 8/1997 | Sato et al. |
| 5,875,722 A | * | 3/1999 | Gosselin et al. ............ 110/345 |
| 5,925,322 A | * | 7/1999 | Werth ......................... 422/170 |
| 6,001,499 A | * | 12/1999 | Grot et al. .................... 429/22 |
| 6,010,675 A | * | 1/2000 | Trocciola et al. ........... 423/427 |
| 6,077,620 A | * | 6/2000 | Pettit ............................ 429/26 |
| 6,120,925 A | * | 9/2000 | Kawatsu et al. .............. 429/40 |
| 6,165,633 A | * | 12/2000 | Negishi ....................... 429/17 |
| 6,309,768 B1 * | | 10/2001 | Patterson et al. ............. 429/13 |
| 6,403,049 B1 * | | 6/2002 | Van Keulen et al. ....... 423/247 |
| 6,455,182 B1 * | | 9/2002 | Silver .......................... 429/17 |
| 6,485,853 B1 * | | 11/2002 | Pettit et al. ................... 429/17 |

(Continued)

FOREIGN PATENT DOCUMENTS

DE            43 22 765         6/1994

(Continued)

OTHER PUBLICATIONS

"Heureka?" in DE-Z Autotechnik No. May 1997, pp. 20-21.

(Continued)

*Primary Examiner*—Jonathan Crepeau
(74) *Attorney, Agent, or Firm*—Kenyon & Kenyon LLP

(57) ABSTRACT

A fuel-cell system, particularly a fuel-cell system for a drive system of a motor vehicle, includes an autothermic reformer unit configured to generate hydrogen from a raw material. The hydrogen is used to operate a fuel-cell unit disposed downstream of the reformer unit. An oxidation device configured to convert carbon monoxide into carbon dioxide is disposed between the reformer unit and the fuel cell unit. A water injection device is disposed in the oxidation device and is configured to inject water into the oxidation device.

9 Claims, 1 Drawing Sheet

U.S. PATENT DOCUMENTS

| | | | |
|---|---|---|---|
| 6,495,113 B1 * | 12/2002 | Aoyama | 423/247 |
| 6,531,102 B1 * | 3/2003 | Nakamura et al. | 422/198 |

FOREIGN PATENT DOCUMENTS

| | | |
|---|---|---|
| DE | 43 18 818 | 12/1994 |
| DE | 44 25 634 | 10/1995 |
| DE | 43 29 323 | 5/1996 |
| DE | 195 44 895 | 2/1997 |
| DE | 196 35 008 | 3/1997 |
| DE | 196 48 995 | 4/1997 |
| DE | 195 45 186 | 6/1997 |
| DE | 43 45 319 | 7/1997 |
| DE | 196 29 084 | 1/1998 |
| EP | 0 217 532 | 11/1989 |
| EP | 0 356 906 | 3/1990 |
| EP | 0 456 848 | 11/1991 |
| EP | 0 629 014 | 5/1994 |
| EP | 0 629 013 | 4/1997 |
| EP | 0 776 861 | 6/1997 |
| EP | 0 833 401 | 4/1998 |
| EP | 1161991 * | 12/2001 |
| WO | WO 92/07392 | 4/1992 |
| WO | WO 96/00186 | 1/1996 |
| WO | WO 96/20506 | 7/1996 |
| WO | WO 97/10619 | 3/1997 |
| WO | WO 97/16648 | 5/1997 |
| WO | WO 97/21257 | 6/1997 |

OTHER PUBLICATIONS

"Alternative Fuel" in the Japanese periodical, Asia Pacific Automotive Report, Jan. 20, 1998, Vo.1. 272, pp. 34-39.

\* cited by examiner

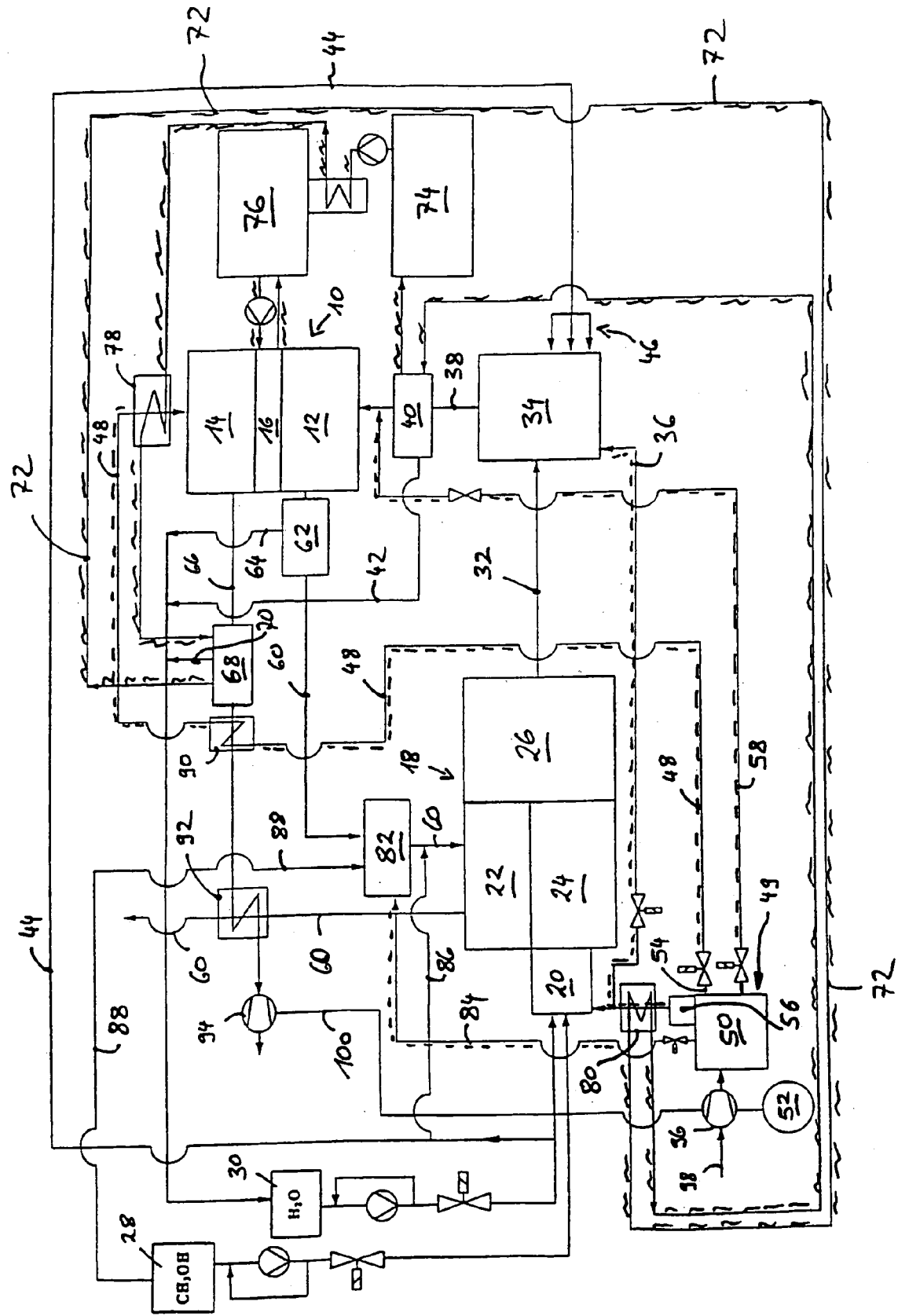

FUEL CELL SYSTEM AND METHOD FOR GENERATING ELECTRICAL ENERGY USING A FUEL CELL SYSTEM

FIELD OF THE INVENTION

The present invention relates to a fuel-cell system particularly a drive system of a motor vehicle, having a reformer unit for producing hydrogen from a raw material, such as, for example, a liquid raw material, while feeding in air, in order to operate a downstream fuel-cell unit; An oxidation device for converting carbon monoxide into carbon dioxide is located between the reformer unit and the fuel-cell unit. In addition, the present invention relates to a method for generating electrical energy, using a fuel-cell system, particularly for a drive system of a motor vehicle; Hydrogen is produced from a raw material, in a reforming process, as air is fed in, in order to operate a fuel-cell unit; Carbon monoxide is oxidized to carbon dioxide after the reforming process and in front of the fuel-cell unit.

BACKGROUND INFORMATION

A catalytic hydrogen generator is known from EP 0 217 532, which produces hydrogen from a methanol-air mixture in an autothermal reformer unit. Located in the reformer unit is a thermocouple, which controls the supply of air to the methanol-air mixture so that the air supply is reduced as the temperature increases at the location of the thermocouple in the reformer.

International Published Patent Application No. WO 96/00186 describes a hydrogen generator, the catalyst being positioned around an inlet pipe for the methanol-air mixture, so that the methanol-air mixture flows radially through the catalyst.

German Published Patent Application Nos. 43 45 319 and 43 29 323 each describe a fuel-cell current-generating system, in which hydrogen is produced from a methanol-water mixture in a reformer unit. The hydrogen is supplied to a downstream fuel cell for generating electrical energy. To generate a sufficient amount of heat for the reaction in the reformer, a portion of the methanol is not added to the methanol-water mixture but is rather combusted in an additional burner.

An electric vehicle having a driving battery made of fuel cells is described in German Published Patent Application No. 196 29 084, the fuel cells being arranged in such that they are cooled by the wind from driving.

In the article "Heureka?" in DE-Z Autotechnik No. 5/1997, on pages 20 to 21, a motor vehicle having a fuel-cell drive is described, where the hydrogen necessary for operating the fuel cells in the vehicle is obtained from gasoline. In this arrangement, the gasoline is converted into hydrogen in a multi-step process. Prior to conversion, the gasoline is converted into the gaseous state by heating it in an evaporator. Hydrogen and carbon monoxide are formed in a partial-combustion reactor, under oxygen-deficient conditions. Copper-oxide and zinc-oxide catalysts are provided for oxidizing the carbon monoxide, and steam is used to supply oxygen for the reaction. In a further step, a final carbon monoxide fraction of approximately 1% is subsequently burned in a conventional platinum oxidation catalyst. The mixture of hydrogen, carbon monoxide, and carbon dioxide obtained in this manner still contains 10 ppm carbon monoxide, which is not harmful to a downstream fuel cell. After being cooled down to approximately 80 degrees Celsius in a heat exchanger, the gas is supplied into the fuel cell.

A similar fuel-cell system for motor vehicles is described in the article "Alternative Fuel" appearing in the Japanese periodical, Asia-Pacific Automotive Report, Jan. 20, 1998, Vol. 272, page 34 to 39, where a methanol reformer unit is provided to produce hydrogen for a fuel cell. In this arrangement, water produced in the electrochemical reaction of hydrogen and oxygen is reused for the reforming process. For the reforming process, deionized water and methanol are mixed, evaporated, and converted into hydrogen and carbon dioxide at a temperature of 250 degrees Celsius. The hydrogen is supplied to a fuel cell, which, in a catalytic process, converts the hydrogen, together with atmospheric oxygen, into electrical energy and water. The heat energy necessary for the evaporation and for the reforming process is produced in a catalytic burner, which is located downstream from the fuel cell and is run by residual gas from the fuel cell. This gas contains hydrogen, since the fuel-cell system only utilizes approximately 75% of the supplied hydrogen. If an insufficient quantity of residual hydrogen is available for the catalytic burner, methanol from the fuel tank is used to generate heat for the reformer. Before introducing the gas produced in the reformer, of which a portion is hydrogen, this gas is purified by a catalytic reaction, in which carbon monoxide is converted into carbon dioxide. In one embodiment of a fuel-cell system for a motor vehicle, the methanol reformer includes an evaporator, a reformer, and an oxidation unit for carbon monoxide.

German Published Patent Application No. 43 22 765 describes a method and a device for dynamically controlling the power output for a vehicle having a fuel cell, which supplies electrical energy to an electrical drive unit. Starting from a power requirement corresponding to the position of an accelerator pedal, a mass flowrate of air is calculated, which is needed by the fuel cell to provide a corresponding, desired power output. The speed of a compressor positioned in an intake line of the fuel cell is controlled as a function of the required air flow rate.

A method and a device for supplying air to a fuel-cell system is described in European Published Application No. 0 629 013. In this arrangement, process air is compressed by a compressor, before it enters a corresponding fuel cell. After process air flows through the fuel cell, the removed exhaust air is expanded over a turbine, in order to recover energy. The turbine, the compressor, and an additional driving motor are arranged on a common shaft. The compressor is designed to have a variable speed, and is arranged, along with an expander in the form of a turbine, on a common shaft, in order to expand the exhaust air. The air flow rate for the fuel cell is controlled by using an expander having a variable absorption capacity.

A screw-type compressor for a refrigerator is described in International Published Patent Application No. WO 97/16648. The screw-type compressor includes two pump chambers, an outlet of a first pump chamber being connected to a secondary inlet of a second pump chamber.

SUMMARY

The present invention is based on the object of providing a fuel-cell system that can be used more economically and in an environmentally friendlier manner, to generate electrical energy, particularly for a drive system of a motor vehicle, while operating at high efficiency and occupying a small space.

The above and other beneficial objects of the present invention are achieved by providing a fuel-cell system and method as described and claimed herein.

The present invention provides for a fuel-cell system having a water-injection device at the oxidation device, the water-injection device injecting water into the oxidation device.

This arrangement has the advantage that, simultaneously to removing carbon monoxide from a process gas, which is from the reformer unit and has a high concentration of hydrogen for the fuel-cell unit, the process gas is sufficiently cooled or precooled, so that it can be directed to the fuel-cell unit without an expensive cooling device or by using a correspondingly less expensive cooling device. In addition, the injected water supplies oxygen necessary to oxidize carbon monoxide, this oxidation reaction simultaneously releasing hydrogen, so that the amount of oxygen having to be separately supplied to the oxidation device can be reduced, and at the same time, the concentration of hydrogen in the process gas can be increased. At the same power output, the additional hydrogen enrichment in the oxidation device allows the fuel-cell system to be dimensioned smaller thereby correspondingly reducing the required space and the cost of equipment for the fuel-cell system.

In one embodiment, the reformer unit includes a mixer for the raw material and an oxygen-containing substance, such as, for example, water and/or air.

A closed water cycle may be attained without having to transport large amounts of water for the reforming process, in that a water-separation device, such as, for example, a condenser, is provided in an exhaust-gas stream from a cathode of the fuel-cell unit, and/or in an exhaust-gas stream from an anode of the fuel-cell unit. The condenser removes the water contained in the corresponding exhaust gas and supplies it to a water storage device connected upstream from the autothermal reformer unit.

An embodiment of the present invention provides a separate water cycle, which cools the water-separation devices, the fuel-cell unit, the air supplied to a cathode of the fuel-cell unit, and/or the air supplied to the reformer unit. To generate the appropriate heat energy necessary for the reaction in the reformer unit, a catalytic burner is provided, which combusts exhaust gas from an anode of the fuel-cell unit and directs the corresponding waste heat through a heat exchanger to the reformer unit.

Alternatively, heat may be generated for the reformer unit by connecting the catalytic burner to a storage tank for the raw material.

Energy may be recovered by providing an expander in a cathode-exhaust stream of the fuel-cell unit and by providing a compressor, such as, for example a two-stage compressor, in a supply-air stream of the fuel-cell unit, the expander and compressor being arranged on a common shaft.

Such a two-stage compressor further increases the environmental compatibility and the efficiency of the fuel-cell system, in that two tappable pressure stages provide the rest of the system with different levels of air pressure. The cathode of the fuel-cell unit is subjected to a relatively low pressure by a first stage, while a second stage initially feeds air at a higher pressure to the reformer unit. Because of its higher relative pressure level, the second stage compensates for the pressure losses occurring along the longer path to the extent that approximately the same pressure is applied to the anode and cathode sides of the fuel-cell unit.

The raw material may include a substance containing hydrogen, such as, for example, methanol or gasoline.

In the method according to the present invention, water is injected during the oxidation of carbon monoxide to carbon dioxide.

This has the advantage that, simultaneously to removing carbon monoxide from a process gas, which is from the reforming process and has a high concentration of hydrogen for the fuel-cell unit, the process gas is sufficiently cooled or precooled, so that it can be directed to the fuel-cell unit without an expensive cooling device or by using a correspondingly less expensive cooling device. In addition, the injected water also supplies the oxygen necessary to oxidize carbon monoxide, this oxidation reaction simultaneously releasing hydrogen, so that the amount of oxygen having to be supplied separately to the oxidation device can be reduced, and at the same time, the concentration of hydrogen in the process gas is increased. At the same power output, the additional hydrogen enrichment in the oxidation device allows the fuel-cell system to be dimensioned smaller, thereby correspondingly reducing the required space as well as the cost of equipment for the fuel-cell system.

In order for the supply water to achieve a high efficiency, it may be injected in the form of a vapor or aerosol.

An additional increase in the efficiency of the fuel-cell unit may be attained by supplying compressed air to a process gas between the carbon monoxide oxidation and the fuel-cell unit and/or to a cathode of the fuel-cell unit.

A closed water cycle may be attained without having to transport large amounts of water for the reforming process by removing water from a cathode exhaust stream of the fuel-cell unit and/or from an anode exhaust stream of the fuel-cell unit and supplying it to the reforming process.

To generate the appropriate heat energy necessary for the reaction of the reforming process, an exhaust gas from an anode of the fuel-cell unit is burned, and the corresponding waste heat is supplied to the reforming process.

Alternatively, heat may be generated for the reformer unit by burning a raw material and supplying the corresponding heat energy to the reforming process.

A hydrogen-containing substance, such as, for example, methanol or gasoline, may be used as a raw material.

BRIEF DESCRIPTION OF THE DRAWING

FIG. 1 is a schematic block diagram of an embodiment of a fuel-cell system according to the present invention.

DETAILED DESCRIPTION

In the fuel-cell system, illustrated schematically in FIG. 1 hydrogen for a fuel-cell unit 10 having an anode 12, a cathode 14, and a cooling element 16 is produced by an autothermal reformer unit 18, which includes a mixer 20, a heat exchanger 22, an evaporator 24, and a catalytic reformer 26. To produce hydrogen, a raw material, such as, for example methanol from a methanol tank 28, and water from a water tank 30 are supplied to mixer 20. The mixture of methanol and water is evaporated in evaporator 24, and a process gas in the form of a crude gas 32, which has a high fraction of hydrogen, is generated in a catalytic reaction in catalytic reformer 26.

The crude gas contains, inter alia, carbon monoxide (CO), which must be removed before supplying it into fuel-cell unit 10. Crude gas 32 is directed into an oxidation unit 34, in which carbon monoxide is oxidized to carbon dioxide ($CO_2$) in the presence of air supplied by line 36, so that a CO concentration of less than 20 ppm results. At the same time, water from water tank 30 is supplied via a line 44, the supplied water being injected into oxidation unit 34 by an injection device 46. This simultaneously cools the process gas in oxidation unit 34. In an anode-gas condenser 40, the cleaned gas 38 produced and cooled in this manner has water removed from it, which is supplied back to water tank 30 via line 42. Cleaned gas 38 having a high concentration of hydrogen is then directed into anode 12 of fuel-cell unit 10. For example, cleaned gas 38 contains 50% $H_2$, 25% $N_2$, and 25% $CO_2$ at a temperature of approximately 180 to 200 degrees Celsius.

Before being directed into anode 12, cleaned gas 38 is cooled down, for example to approximately 85 degrees Celsius in anode-gas condenser 40.

On cathode side 14, compressed air from a two-stage, screw-type compressor 50 is supplied via line 48 to fuel-cell unit 10. All of the air lines are indicated by dotted lines in FIG. 1. Thus, the fuel-cell unit generates electrical energy in a conventional manner by the reaction $$H_2 + \tfrac{1}{2}O_2 \rightarrow H_2O + \text{el. energy.}$$

The electrical energy can be tapped off at electrodes 12, 14 and supplied to an electric motor 52. Two-stage, screw-type compressor 50 includes a first stage 54 having a pressure of for example, approximately 3 bar for cathode 14; and a second stage 56 having a pressure of, for example, 3.7 bar for the fuel gas, i.e., dehydrated, cleaned gas 38, to be supplied to anode 12. Using another tap on screw-type compressor 50, compressed air is supplied via line 58 to cleaned gas 38, downstream from anode-gas condenser 40.

A water separator 62, separates water from anode gas 60 and supplies it via line 64 to water tank 30. Disposed in cathode exhaust stream 66 is a condenser 68, which removes water from cathode gas 66 and supplies it via line 70 to water tank 30. A closed water circulation loop for the process gas is thus formed, so that large amounts of water do not have to be transported for the production of hydrogen in reformer unit 18.

A separate water circulation loop 72 indicated by a wavy line in FIG. 1 is provided to cool the air supplied to mixer 20, to cool anode gas condenser 40, water separator 62, and condenser 68, and to cool the air 48 supplied to cathode 14. This separate water circulation loop 72 includes a cooling-water tank 74, a deionized water tank 76, and corresponding heat exchangers 78 and 80 at cathode 14 air supply 48 and mixer 20 air supply, respectively.

Anode exhaust stream 60 flows into catalytic burner 82, in which anode gas 60 is further combusted to form heat energy. This heat energy is transferred by heat exchanger 22 to evaporator 24 and catalytic reformer 26, where it sustains the catalytic reaction for producing hydrogen. Air is supplied to catalytic burner 82 by line 84. Downstream from catalytic burner 82, water from water tank 30 may optionally be supplied to anode gas 60 by line 86. Alternatively, methanol from methanol tank 28 may be supplied by line 88 to catalytic burner 82 so that even in the case of an insufficient anode exhaust stream 60, for example, during start-up of the fuel-cell system, it is ensured that a sufficient amount of heat energy is generated the reformer unit 18.

Cathode exhaust stream 66 is cooled in a heat exchanger 90 of separate water circulation loop 72 and is then thermally coupled, via heat exchanger 92, to anode exhaust stream 60 before both exhaust streams 60 and 66 exit the system.

In this arrangement, cathode exhaust stream 66 is directed through an expansion turbine 94 that is positioned, together with a compressor 96 for drawing in air 98, on a common shaft 100. The compressor is provided as an input stage, in front of two-stage compressor 50. Thus, energy contained in cathode exhaust stream 66 is recovered in order to compress air 98 in compressor 96.

A particular advantage of this embodiment, which is characterized by a high efficiency, a small space requirement, and a low equipment cost, is achieved by combining two-stage compressor 50 and autothermal reformer unit 18 with the additional injection 46 of cooling water during the selective oxidation of carbon monoxide (CO) in oxidation unit 34 and by combining this with an autonomous water circulation loop 30, 40, 42, 62, 64, 68, 70.

What is claimed is:

1. A method for generating electrical energy using a fuel-cell system, comprising the steps of:
    producing hydrogen from a raw material in a reforming process, a fuel-cell unit of the fuel-cell system being operable in accordance with the produced hydrogen;
    oxidizing carbon monoxide into carbon dioxide after the reforming process and upstream of the fuel-cell unit;
    injecting water during the oxidizing step to supply oxygen to oxidize carbon monoxide into carbon dioxide; and
    based on the oxygen supplied by the injected water, supplying a reduced amount of a supplemental oxygen containing substance for the oxidizing step.

2. A method for generating electrical energy using a fuel-cell system, comprising the steps of:
    producing hydrogen from a raw material in a reforming process, a fuel-cell unit of the fuel-cell system being operable in accordance with the produced hydrogen;
    oxidizing carbon monoxide into carbon dioxide after the reforming process and upstream of the fuel-cell unit;
    injecting water during the oxidizing step to supply oxygen to oxidize carbon monoxide into carbon dioxide; and
    based on the oxygen supplied by the injected water, supplying a reduced amount of a supplemental oxygen containing substance for the oxidizing step;
    wherein the fuel-cell system includes a drive system of a motor vehicle.

3. The method according to claim 1, wherein the water is injected as one of a vapor and an aerosol.

4. The method according to claim 1, further comprising the step of supplying compressed air to at least one of a process gas between a carbon monoxide oxidizing unit and the fuel-cell unit and a cathode of the fuel-cell unit.

5. The method according to claim 1, further comprising the steps of:
    separating water from at least one of a cathode-exhaust stream of the fuel-cell unit and an anode-exhaust stream of the fuel-cell unit; and
    supplying the separated water to the reforming process.

6. The method according to claim 1, further comprising the steps of:
    burning an exhaust gas from an anode of the fuel-cell unit; and
    supplying waste heat generated by the burning step to the reforming process.

7. A method for generating electrical energy using a fuel-cell system, comprising the steps of:
    producing hydrogen from a raw material in a reforming process, a fuel-cell unit of the fuel-cell system being operable in accordance with the produced hydrogen;
    oxidizing carbon monoxide into carbon dioxide after the reforming process and upstream of the fuel-cell unit;

injecting water during the oxidizing step to supply oxygen to oxidize carbon monoxide into carbon dioxide;

based on the oxygen supplied by the injected water, supplying a reduced amount of a supplemental oxygen containing substance for the oxidizing step;

burning the raw material; and supplying heat energy generated by the raw material burning step to the reforming process.

8. The method according to claim 1, wherein the raw material includes a hydrogen-containing substance.

9. The method according to claim 8, wherein the hydrogen-containing substance includes at least one of methanol and gasoline.

* * * * *